United States Patent [19]

Lin

[11] Patent Number: 4,478,330
[45] Date of Patent: Oct. 23, 1984

[54] VERSATILE POCKET-SIZE CONTAINER

[76] Inventor: Ching H. Lin, 13 F., No. 137, Sec. 2 Nanking E. Rd., Taipei, Taiwan

[21] Appl. No.: 536,280

[22] Filed: Sep. 27, 1983

[51] Int. Cl.³ .................. A45C 11/00; B65D 85/38; G06F 15/02

[52] U.S. Cl. .................. 206/38; 206/301; 206/305; 206/232; 206/234

[58] Field of Search .............. 206/38, 232, 234, 214, 206/216, 223

[56] References Cited

U.S. PATENT DOCUMENTS

| 1,354,211 | 9/1920 | Reed | 206/38 |
| 1,530,070 | 3/1925 | Bovee | 206/234 |
| 2,371,308 | 3/1945 | Mosch | 206/38 |
| 2,630,362 | 3/1953 | Bass | 206/38 |
| 4,075,702 | 2/1978 | Davies | 206/232 |
| 4,308,951 | 1/1982 | Walker, Jr. | 206/214 |

FOREIGN PATENT DOCUMENTS 1094208 12/1954 France .................. 206/214

Primary Examiner—William T. Dixson, Jr.
Attorney, Agent, or Firm—Tak K. Sung

[57] ABSTRACT

The present invention relates to a versatile pocket-size container, and in particular to one mainly comprising an upper body, a lower body and a cover in which are accomodated scores of daily necessities thereby beneficially assembling several tens of functions in a container.

5 Claims, 5 Drawing Figures

VERSATILE POCKET-SIZE CONTAINER

BACKGROUND OF THE INVENTION

Up to now, the daily necessities such as pen, cigarette lighter, electronic calculator, radio . . . etc., are encased in a brief case at the time of traveling. However, such daily necessities put together with the ticket, passport, money . . . etc. will be much troublesome when desired to find out one or more things from the brief case.

Accordingly, for the purpose of obviating the trouble, the inventor of this invention, after numerous experiments, creates a versatile pocket-size container.

SUMMARY

It is a primary object of the present invention to provide a versatile pocket-size container which is convenient to carry.

It is another object of the present invention to provide a versatile pocket-size container which is slightly larger than a cigarette case.

It is still another object of the present invention to provide a versatile pocket-size container which has scores of uses.

It is a further object of the present invention to provide a versatile pocket-size container comprising an upper body, a lower body and a cover which are hinged together.

A better understanding of the present invention will be obtained by those skilled in the art when the following detailed description of the best mode contemplated for practicing the invention is read in conjunction with the accompanying drawings wherein like numerals refer to like or similar parts and in which:

DETAILED DESCRIPTION OF THE PREFERRED EMBODIMENT

Figure 1:
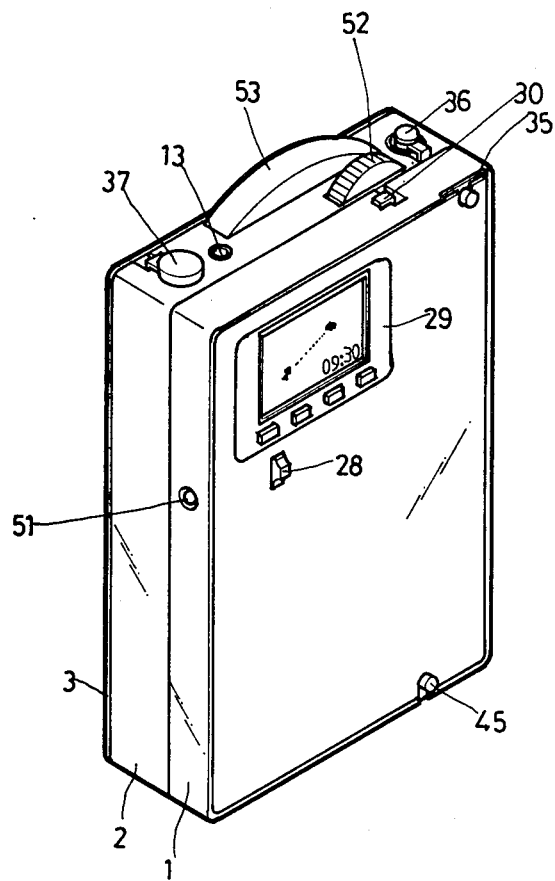
FIG. 1 is a perspective view of a versatile pocket-size container of a preferred embodiment according to the present invention.

Certain terminology will be used in the following detailed description for convenience in reference only and will not be limiting. The words "lower" and "upper", "right" and "left" will designate directions in the drawings to which reference is made. Said terminology will include the words above specifically mentioned derivatives thereof and words of similar import.

Figure 2:
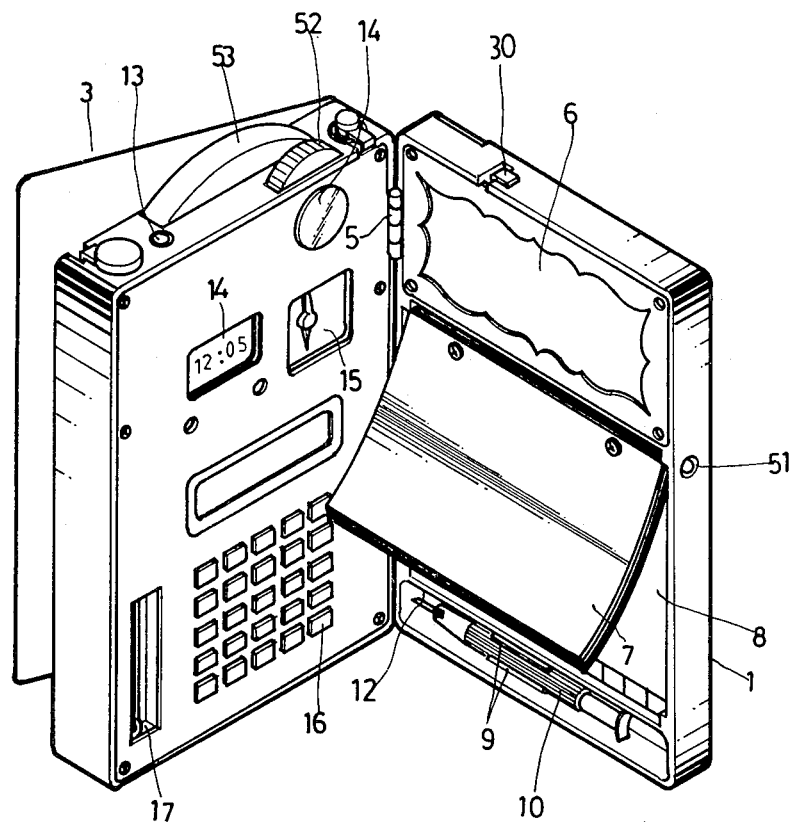
FIG. 2 is a perspective view of the versatile pocket-size container with the upper body opened.
Figure 3:
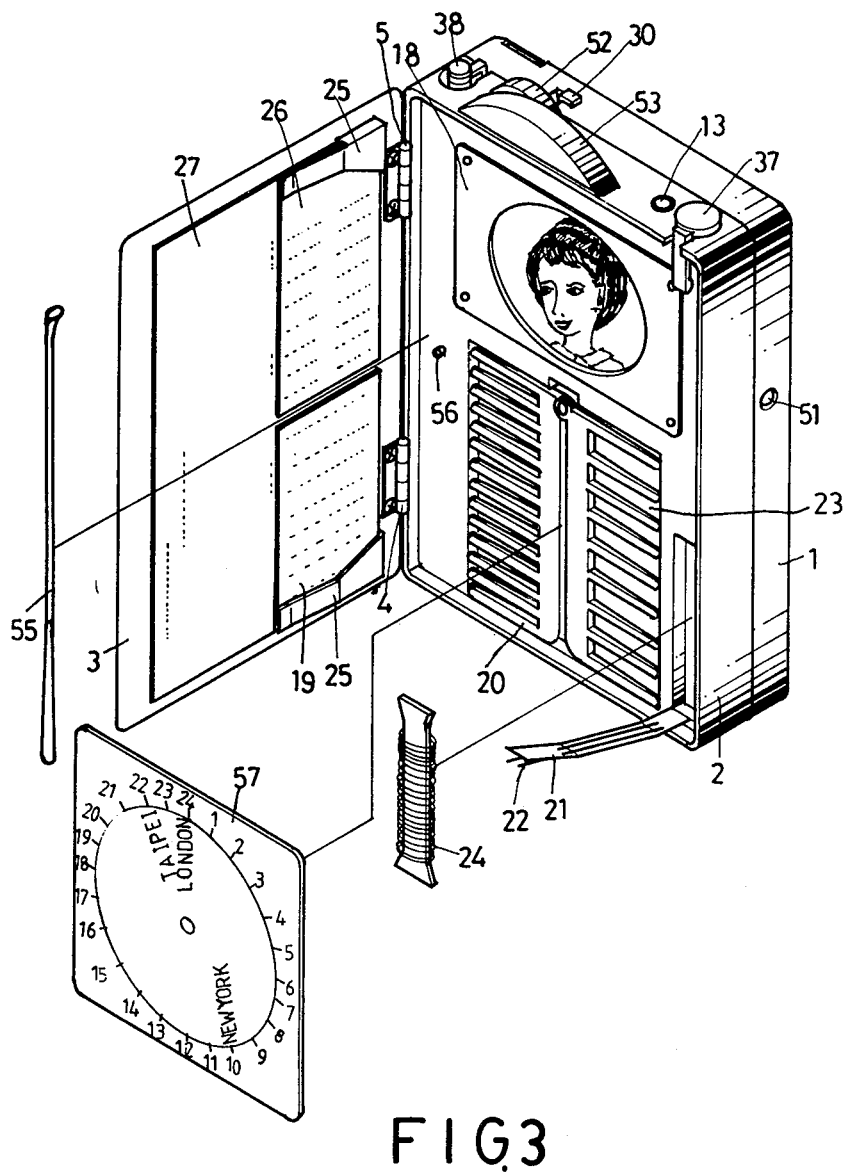
FIG. 3 is a perspective view of the versatile pocket-size container with the cover opened.

Referring to the drawings and in particular to FIGS. 1, 2 and 3 thereof, the versatile pocket-size container according to the present invention comprises an upper body (1), a lower body (2) and a cover (3). The upper body (1), the lower body (2) and the cover (3) are joined together by hinges (4) and (5) so that the upper body (1), the lower body (2) and the cover (3) may be opened or closed with respect to one another.

With reference to FIG. 1, the upper body (1) is provided with a television game (29) and a switch (28) at the front and a lamp (51) at the left. The switch (28) is served to control the lamp (51) which is supplied by batteries stored into the interior of the upper body (1).

Referring to FIG. 2, there is shown a perspective view of the versatile pocket-size container with the upper body (1) opened. As shown, the inner side of the upper body (1) is equipped with a mirror (6), a note pad (7), and a screw driver (10) respectively located at its upper portion, middle portion and lower portion. Under the note pad (7) is an address pad (8). The screw driver (10) is kept in place by clamping means (9) so that the screw driver (10) will easily be taken out but not drop out unintentionally. Furthermore, the screw driver (10) comprises a core rod (12) one end of which is designed for use with philips head screws and the other end of which is for use with slotted head screws.

Figure 4:
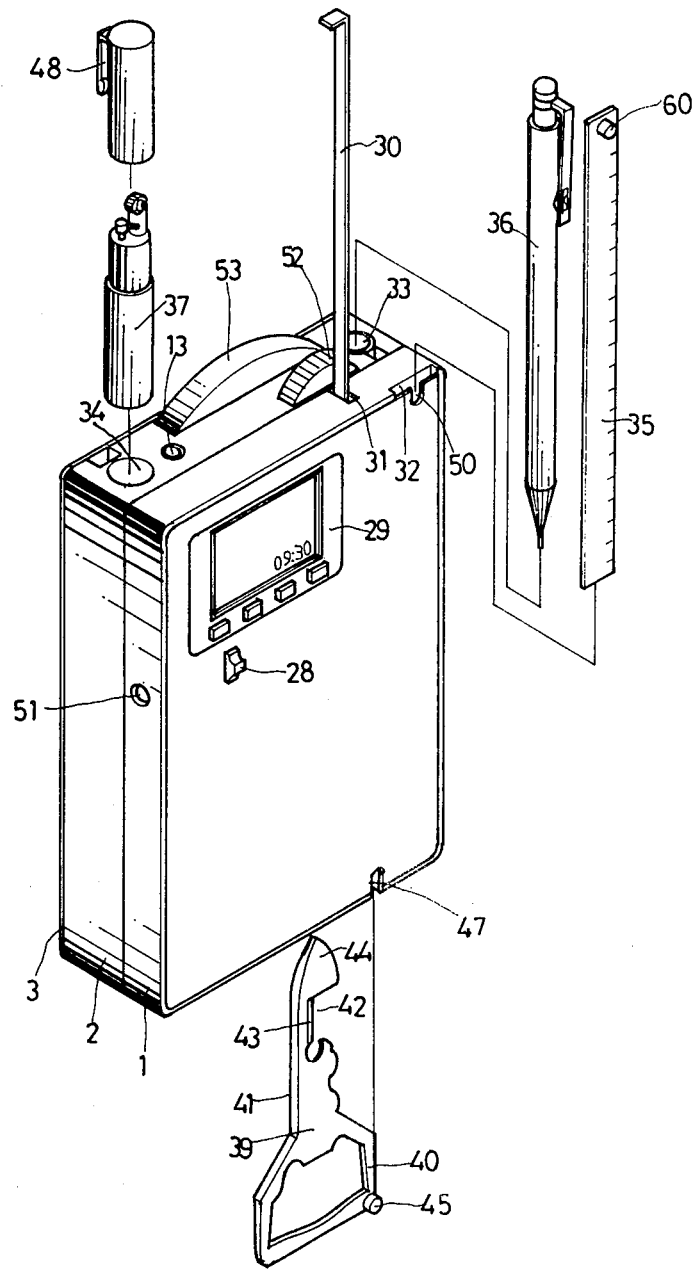
FIG. 4 is a fragmentary perspective view of the versatile pocket-size container.
Figure 5:
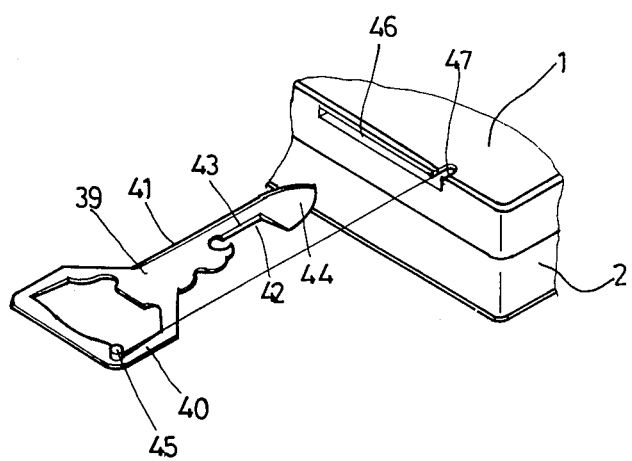
FIG. 5 is a partial perspective view showing the way to insert the multi-purpose tool into the upper portion.

With reference to FIG. 4, there is shown a fragmentary perspective view of the versatile pocket-size container. On the top of the upper body (1) is a slot (31) through which a tape measure (30) may be pulled out. A ruler (35) the rear side (not shown) of which is in the form of a file for shaping nails is inserted into the upper body (1) from the top of the upper body (1) in the manner that protuberance (60) of the ruler (35) is fitted into groove (50) of the upper body (1) so as to enable the ruler (35) to be taken out easily. At the bottom of the upper body (1) is mounted a multi-purpose tool (39) which is composed of a bottle cap opener (40), a knife blade (41), a can opener (42), a pencil-sharpening knife (43) and a scraper (44). The multi-purpose tool (39) is inserted into the bottom of the upper body (1) in the manner that protuberance (45) of the multi-purpose tool (39) is fitted into groove (47) of the upper body (1). Further, a fragrant substance such as a perfume soap (not shown) is stored into the upper body (1).

Referring to FIG. 2 again, the lower body (2) is provided with a radio having a tuning dial (52), a frequency indicator (14) and an earphone receptable (13). In addition, the lower body (2) is equipped with an electronic watch (14), a compass (15), an electronic calculator (16) and a thermometer (17). The electronic watch (14) may be preset to the time of the destination, the compass (15) is served for determining direction, and the thermometer (17) may indicate the temperature so as to give notice of wearing.

With reference to FIG. 3, there is shown a perspective view of the versatile pocket-size container with the cover (3) opened. As shown, another side of the lower body (2) is provided with a picture frame (18). Below the picture frame (18) is a recess (23) in which is placed a collapsible comb (20). On the collapsible comb (20) is a world time chart (57). At the bottom right side of the lower body (1) is a needle stand (21) equipped with needles (22) on which is placed a reel (24) of threads. At the left of the lower body (2) is an earpick (55) which is fixed in position by a protuberance (56) of the lower body (2).

On the top of the lower body (2) there are a first hole (33) into which a writing implement (36) is inserted, and a second hole (34) into which a cigarette lighter (37) is inserted. Between the first hole (33) and the second hole (34) are mounted an antenna (53), an earphone receptable (3) and a tuning dial (52).

The inner side of the cover (3) is equipped with a pair of clips (25) by means of which a calendar (26) good for any future years and a conversion table (19) are fixed in position. Under the calendar (26) and the conversion table (19) may be placed namecard (27) or the like.

As stated above, the versatile pocket-size container according to the present invention is just slightly larger than a cigarette case and is possessed of scores of daily necessities such as a mirror (6), an address pad (8), a note pad (7) a screw driver (9), a lamp (51), a tape measure (30), a ruler (35), a television game (29), a multi-purpose tool (39) composed of a bottle cap opener (40), a can opener (42), a knife blade (41), a pencil sharpening knife (43) and a scraper (44), a pen (33), a cigarette lighter (34), a radio, a watch (14), a compass (15), an electronic calculator (16), a thermometer (17), a picture frame (18), a collapsible comb (20), a reel of threads (24), a needle stand (21), a pair of clips (25) for mounting namecards (27) or the like, and an earpick (55). Consequently the present invention is indeed an innovation which may be conveniently carried and is provided with scores of uses.

Although this invention has been described with a certain degree of particularity, it is understood that the present disclosure has been made by way of example only and that numerous changes in the detail of construction and the arrangement and combination of parts may be resorted to without departing from the scope and spirit of the invention as hereinafter claimed.

I claim:

1. A versatile pocket-size container comprising:

an upper body having a tape measure, a mirror, an address pad, a note pad, a screw driver, an electronic game, a multi-purpose tool, a ruler, a lamp and a fragrant substance;

a lower body hinged together with said upper body, said lower body having a radio, a watch, a compass, an electronic calculator, a thermometer, a picture frame, a comb, an earpick, a world time chart, a number of needles, a reel of threads, a pen and a cigarette lighter; and a cover hinged together with said lower body, said cover having a pair of clips by means of which a calendar, a conversion table and namecards are fixed in position.

2. A versatile pocket-size container as claimed in claim 1, wherein said multi-purpose tool is provided with a bottle cap opener, a knife, a can opener, a pen sharpening knife, and a scraper.

3. A versatile pocket-size container as claimed in claim 1, wherein the rear side of said ruler is in the form of a file for shaping nails.

4. A versatile pocket-size container as claimed in claim 1, wherein said multi-purpose tool is inserted into said upper portion.

5. A versatile pocket-size container as claimed in claim 1, wherein said fragrant substance is stored into said upper body.

* * * * *